H. D. ELLS.
TRUCK.
APPLICATION FILED OCT. 18, 1915.

1,274,152.

Patented July 30, 1918.

Witness
R. C. Hamilton

Inventor
Hallett D. Ells
Warren D. House

By

His Attorney

UNITED STATES PATENT OFFICE.

HALLETT D. ELLS, OF KANSAS CITY, MISSOURI.

TRUCK.

1,274,152.

Specification of Letters Patent.

Patented July 30, 1918.

Application filed October 18, 1915. Serial No. 56,440.

*To all whom it may concern:*

Be it known that I, HALLETT D. ELLS, a subject of Great Britain, residing at Kansas City, in the county of Jackson and State of Missouri, have invented a certain new and useful Improvement in Trucks, of which the following is a specification.

My invention relates to improvements in trucks.

It relates particularly to trucks adapted for supporting and transporting barrels.

One of the objects of my invention is to provide a truck with which a load, such as a barrel, may be easily raised from the floor and the truck swung with the load from the vertical to a horizontal position.

Another object of my invention is to provide a truck with handles which may be moved from an operative rearwardly extending position to a folded position for the conservation of space.

Still another object of my invention is to provide a truck which may be economically manufactured, which will be strong and durable and which is not liable to get out of order.

The novel features of my invention are hereinafter fully described and claimed.

In the accompanying drawing which illustrates the preferred embodiment of my invention, Figure 1 is a perspective view of my improved truck, the handles being shown in the rearwardly extending position.

Similar reference characters designate similar parts in the different views.

Figure 1:
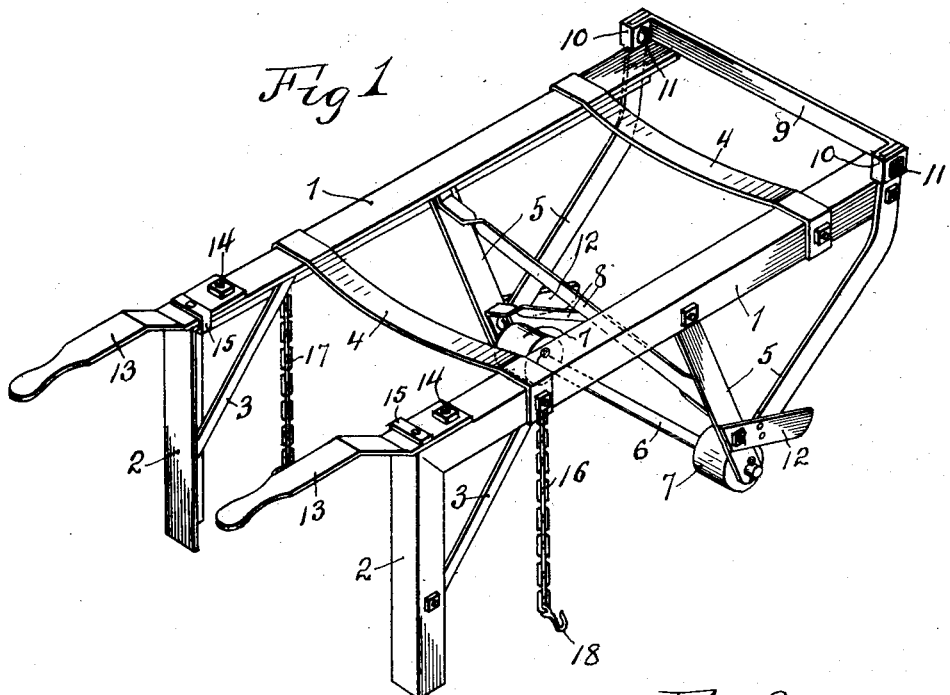

The frame of the truck comprises a body having two parallel longitudinal angle bars 1, the rear ends of which are turned at an angle so as to form legs 2, to which are respectively secured one set of ends of two braces 3, the other set of ends of which are respectively secured to the horizontally extending portions of the bars 1.

Two transverse supporting bars 4 have one set of ends secured to one angle bar 1, and the other set of ends secured to the other angle bar 1. Two downwardly extending arms 5 are respectively secured to the angle bars 1. A roller support comprising a transverse horizontal bar 6 having mounted thereupon two rollers or wheels 7, is rotatably mounted in the arms 5 and serves as a wheeled support for the frame and also as a fulcrum upon which the frame may be swung from the horizontal position shown in the drawing to the vertical loading and unloading position.

Two crossed braces 8 are respectively secured to the arms 5, adjacent to the rollers 7, at one set of ends, the other set of ends being respectively secured to the angle bars 1, as shown in Fig. 1.

Each of the arms 5 at its forward portion preferably extends above the adjacent angle bar 1, as the truck is viewed in Fig. 1. A transverse bar 9 is disposed edgewise to the upper sides of the angle bars 1, and forming a load supporting lip is provided at its respective ends with two U-shaped portions 10 which respectively embrace and are secured by bolts 11 to the upwardly extending forward portions of the arms 5.

The forward edges of the arms 5 are located at the forward end of the frame and are adapted to support the frame in a substantially vertical position when a barrel or other package is being loaded upon or unloaded from the truck. The forward portions of the arms 5 serve as a fulcrum upon which the frame is first swung as it is moved from the vertical to the horizontal position.

The arms 5 are respectively provided with two plates 12, which extend forwardly of the rollers 7, the forward ends of said plates serving as an intermediate fulcrum upon which the frame may swing in passing between the horizontal and vertical positions.

The fulcrum formed by the forward ends of the plates 12 is located intermediate of and spaced apart from the fulcra formed by the rollers 7 and the extreme forward portions of the arms 5. By having the fulcra so spaced apart, the truck may be swung from the upright loading position to a position in which the intermediate fulcrum or plates 12 will strike the floor, without the barrel or other load carried by the truck being lifted but a slight distance. When the truck has been swung with the load to a position in which the intermediate fulcrum or plates 12 strike the floor, the center of gravity of the load will have passed to a point substantially vertically above the intermediate fulcrum. In the continued swinging movement on the intermediate fulcrum toward the horizontal position, the load will be lifted a relatively large amount, but this will be easily accomplished as a portion of the load will be descending in the turning movement of the truck on the fulcrum plates 12, and will, therefore, assist in lifting that portion of the load which is rising with the forward end of the truck. For effecting this function, the intermediate fulcrum is located closely adjacent to the rollers 7, the latter being relatively so located as to have the load transferred thereto, after the truck has been swung substantially 45 degrees from the vertical.

Figure 2:
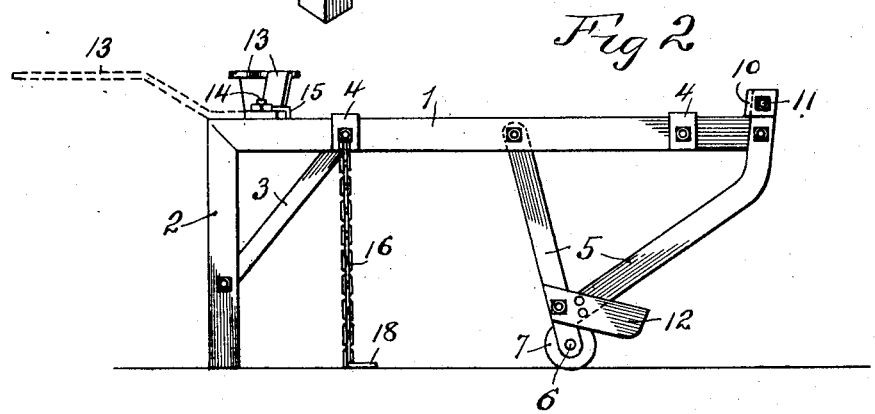
Fig. 2 is a side elevation of the same, the handles being shown in solid lines in the folded position and in dotted lines in the rearwardly extending position.
Figure 3:
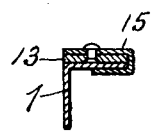
Fig. 3 is an enlarged cross section through one of the handles.

Two handles 13 are respectively pivoted by vertical bolts 14 to the upper sides of the angle bars 1 adjacent to the rear ends of the horizontal portions thereof. The handles 13 are adapted to be swung from the rearwardly extending horizontal operative position shown in Fig. 1, and in dotted lines in Fig. 2 to a transverse horizontal position shown in solid lines in Fig. 2. When disposed in the last named position, the handles 13 will be so disposed as to conserve space.

Secured to each handle 13 is a U-shaped plate 15, disposed at the rear of the adjacent bolt 14 and adapted to embrace the adjacent angle bar 1, in the horizontal portion thereof, when the handle is swung to the rearwardly extending position shown in Fig. 1.

Respectively attached at one set of ends to the angle bars 1 are two chains 16 and 17, which are adapted to embrace a barrel or other package which is mounted on the transverse bars 4. The free end of the chain 16 is provided with a hook 18, which is adapted to releasably engage one of the links of the chain 17, when the chains are in the embracing position.

In the operation of my improved truck, the truck is swung to the loading position, that is the vertical position, and the lip 9 is inserted under the barrel or package to be loaded. The barrel is tilted against the bars 4, after which the chains 16 and 17 are fastened together over the barrel. The truck is then swung by grasping the handles 13, which are in the rearwardly extending position, upon the forward fulcrum until the intermediate fulcrum constituting the forward ends of the plates 12, at which time the barrel will only be slightly lifted from the floor. The weight will now be transferred to the intermediate fulcrum, which will carry the load in a balanced condition on the fulcrum until the rollers 7 strike the floor, at which time the load will be transferred to the rollers 7, and the truck then easily swung to the horizontal position shown in the drawing.

From the foregoing description it will be understood that a barrel or other similar load may be easily raised from the floor and the truck swung therewith to the horizontal position with a minimum expenditure of strength, this result being capable of accomplishment owing to the arrangement of the different fulcra upon which the truck is swung.

Modifications of my invention may be made, within the scope of the appended claim, without departing from the spirit of my invention.

What I claim is:—

In a truck, a frame having two supporting arms adapted to support the truck in a substantially upright position, a roller support mounted in said arms for supporting the frame in a horizontal position, and two plates secured respectively to said arms and extending forwardly beyond the roller support and beyond the forward edges of said arms and coöperating with the arms and with said roller support for supporting the frame in two positions of rest respectively intermediate of the upright and of the horizontal positions.

In testimony whereof I have signed my name to this specification.

HALLETT D. ELLS.

Copies of this patent may be obtained for five cents each, by addressing the "Commissioner of Patents, Washington, D. C."